(12) United States Patent
Kil et al.

(10) Patent No.: US 10,274,769 B2
(45) Date of Patent: Apr. 30, 2019

(54) DISPLAY DEVICE

(71) Applicant: LG ELECTRONICS INC., Seoul (KR)

(72) Inventors: Hyongil Kil, Seoul (KR); Sangmin Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/648,140

(22) Filed: Jul. 12, 2017

(65) Prior Publication Data

US 2018/0017827 A1 Jan. 18, 2018

(30) Foreign Application Priority Data

Jul. 13, 2016 (KR) ........................ 10-2016-0088466

(51) Int. Cl.
*G02F 1/1333* (2006.01)
*F21V 8/00* (2006.01)

(52) U.S. Cl.
CPC ....... *G02F 1/133308* (2013.01); *G02B 6/009* (2013.01); *G02B 6/0088* (2013.01); *G02B 6/0086* (2013.01); *G02F 2001/13332* (2013.01); *G02F 2001/133314* (2013.01); *G02F 2001/133317* (2013.01); *G02F 2001/133322* (2013.01); *G02F 2001/133328* (2013.01)

(58) Field of Classification Search
CPC ................................................. G02F 1/133308
See application file for complete search history.

(56) References Cited

U.S. PATENT DOCUMENTS

| 2005/0168954 A1 | 8/2005 | Kim |
| 2008/0079863 A1 | 4/2008 | Jung et al. |
| 2012/0327617 A1* | 12/2012 | Maeyama ......... G02F 1/133308 361/752 |

FOREIGN PATENT DOCUMENTS

| KR | 10-2016-0078038 A | 7/2016 |
| WO | WO 2015/002017 A1 | 1/2015 |

* cited by examiner

*Primary Examiner* — Anne M Hines
(74) *Attorney, Agent, or Firm* — Birch, Stewart, Kolasch & Birch, LLP

(57) ABSTRACT

A display device can include a frame; a reflection sheet disposed on the frame; a housing coupled to at least one side of the frame; a substrate disposed on the housing; a light assembly mounted on the substrate; a light guide plate disposed on the reflection sheet and at a side of the light assembly; a guide panel coupled to another side of the frame; and a display panel disposed on the light guide plate, in which the display panel is disposed on the guide panel and overlaps with the housing.

19 Claims, 24 Drawing Sheets (a)

(b)

(a)

(b)

DISPLAY DEVICE

CROSS-REFERENCE TO RELATED APPLICATIONS

This application claims the benefit of Korean Patent Application No. 10-2016-0088466 filed in the Republic of Korea on Jul. 13, 2016, the entire contents of which are incorporated herein by reference for all purposes as if fully set forth herein.

BACKGROUND OF THE INVENTION

Field of the Invention

The present invention relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

In accordance with an aspect of the present invention, a display device includes: a frame; a reflection sheet located on the frame; a housing coupled to at least one side of the frame; a substrate located on the housing; a light assembly mounted on the substrate; a light guide plate located opposite to the light assembly on the reflection sheet; a guide panel coupled to at least another side of the frame; and a display panel located on the light guide plate, in which the display panel is disposed on the housing and the guide panel.

The guide panel can be coupled to the long side of the frame to support a major axis of the display panel, and the housing can be coupled to the short side of the frame to support a minor axis of the display panel.

The guide panel can have both ends bent in a short side direction of the frame.

A bent portion of the guide panel can be coupled to one end of the housing.

The frame can include a depressed portion depressed to a central portion of the frame at the insertion side of the housing, and the depressed portion can be bent in a front surface direction.

In the frame, a height bent in a front surface direction of the depressed portion can be lower than a height bent in a front surface direction of other portions.

The housing can include: a first portion extended in a front surface direction and constituting a side surface of the display device; a second portion bent from the front end of the first portion to a central portion of the frame; and a third portion bent from the rear end of the first portion to a central portion of the frame.

The display panel can be received on the second portion.

The guide panel can include a flange protruded toward the central portion of the frame, and a height of an upper surface of the flange can be the same as that of an upper surface of the second portion.

The guide panel can include a flange protruded toward the central portion of the frame, the flange and the second portion can include a mounting portion depressed to the inside, and the mounting portion can be connected to a portion in which the flange and the second portion contact.

The second portion can include a mounting portion depressed to the inside and can further include a pad inserted into the mounting portion.

The pad can protrude further than an upper surface of the second portion by a predetermined height.

At least a portion of one side surface of the housing can be depressed to the inside.

A bottom surface of the housing can include: an upper end support portion protruded in a front surface direction and a low end support portion protruded in a rear surface direction, in which at least one portion of the low end support portion can include a contact portion supported by the frame, and at least another portion of the low end support portion can include an exposed portion exposed to the outside of the frame.

The exposed portion can be lower than the contact portion most adjacent to the exposed portion by a predetermined height.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
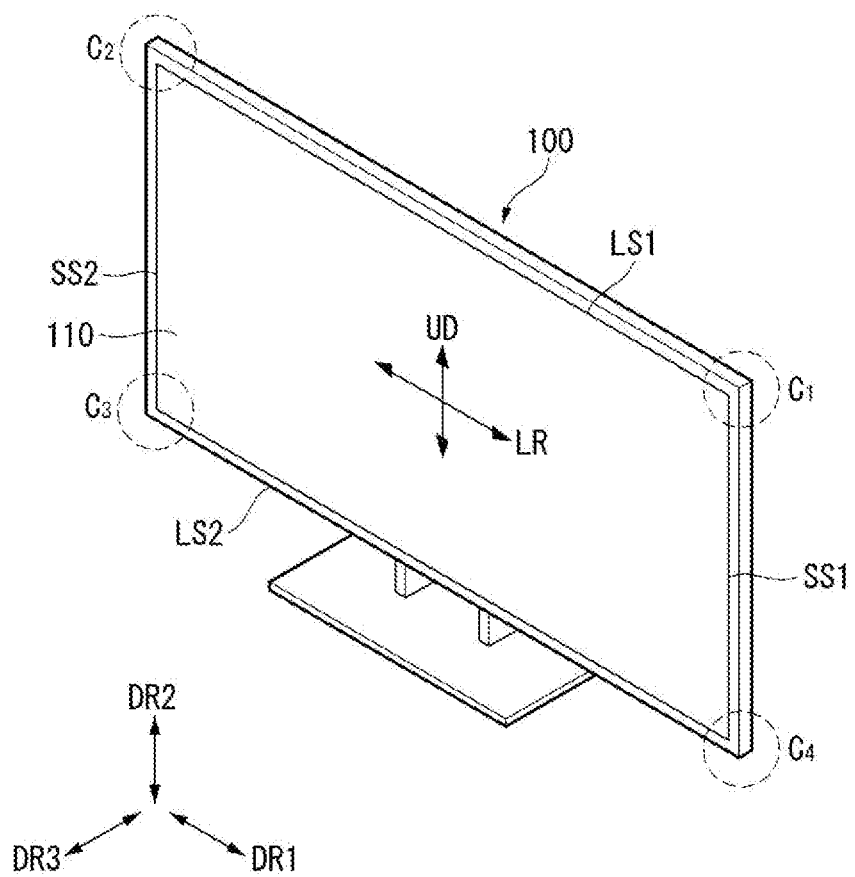
FIGS. 1 to 11 are views illustrating a configuration of a display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention is not limited to specific disclosed embodiments, but includes all modifications, equivalents and substitutes included within the spirit and technical scope of the present invention.

The terms "first," "second," etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels can be used. For example, a plasma display panel (PDP), a field emission display (FED) panel, and an organic light emitting diode (OLED) display panel can be used.

FIGS. 1 to 11 are views illustrating a configuration of a display device according to an exemplary embodiment of the present invention.

A display device 100 can include a first long side LS1, a second long side LS2 opposite the first long side LS1, a first short side SS1 adjacent to the first long side LS1 and the second long side LS2, and a second short side SS2 opposite the first short side SS1.

In an embodiment disclosed herein, the first short side SS1 may be referred to as a first side area; the second short side SS2 may be referred to as a second side area opposite the first side area; the first long side LS1 may be referred to as a third side area which is adjacent to the first side area and the second side area and is positioned between the first side area and the second side area; and the second long side LS2 may be referred to as a fourth side area which is adjacent to the first side area and the second side area, is positioned between the first side area and the second side area, and is opposite to the third side area.

As shown in FIG. 1, lengths of the first and second long sides LS1 and LS2 are longer than lengths of the first and second short sides SS1 and SS2 for the sake of brevity and ease of reading. However, the lengths of the first and second long sides LS1 and LS2 can be almost equal to the lengths of the first and second short sides SS1 and SS2.

In the following description, a first direction DR1 can be a direction parallel to the long sides LS1 and LS2 of the display device 100, and a second direction DR2 can be a direction parallel to the short sides SS1 and SS2 of the display device 100.

Further, a third direction DR3 can be perpendicular to the first direction DR1 and/or the second direction DR2.

For example, the first direction DR1 may be commonly referred to as a horizontal direction (e.g., x-axis) and the second direction DR2 may be commonly referred to as a vertical direction (e.g., y-axis). Further, the third direction DR3 may be referred to as a depth direction (e.g., z-axis).

In another point of view, a side or a surface, on which the display device 100 displays an image, may be referred to as a front side or a front surface (e.g., the side facing the viewer). When the display device 100 displays the image, a side or a surface, at which the image cannot be observed, may be referred to as a back side or a back surface. When the display device 100 is observed at the front side or the front surface, the first long side LS1 may be referred to as an upper side or an upper surface. In the same manner as the first long side LS1, the second long side LS2 may be referred to as a lower side or a lower surface. Further, the first short side SS1 may be referred to as a left side or a left surface, and the second short side SS2 may be referred to as a right side or a right surface.

Further, the first long side LS1, the second long side LS2, the first short side SS1, and the second short side SS2 may be referred to as edges of the display device 100. Positions where the first long side LS1, the second long side LS2, the first short side SS1, and the second short side SS2 meet one another may be referred to as corners. For example, a position where the first long side LS1 and the first short side SS1 meet each other may be referred to as a first corner C1; a position where the first long side LS1 and the second short side SS2 meet each other may be referred to as a second corner C2; a position where the second short side SS2 and the second long side LS2 meet each other may be referred to as a third corner C3; and a position where the second long side LS2 and the first short side SS1 meet each other may be referred to as a fourth corner C4.

In the embodiment disclosed herein, a direction from the first short side SS1 to the second short side SS2 or a direction from the second short side SS2 to the first short side SS1 may be referred to as a left-right direction LR. A direction from the first long side LS1 to the second long side LS2 or from the second long side LS2 to the first long side LS1 may be referred to as an up-down direction UD.

Figure 2:
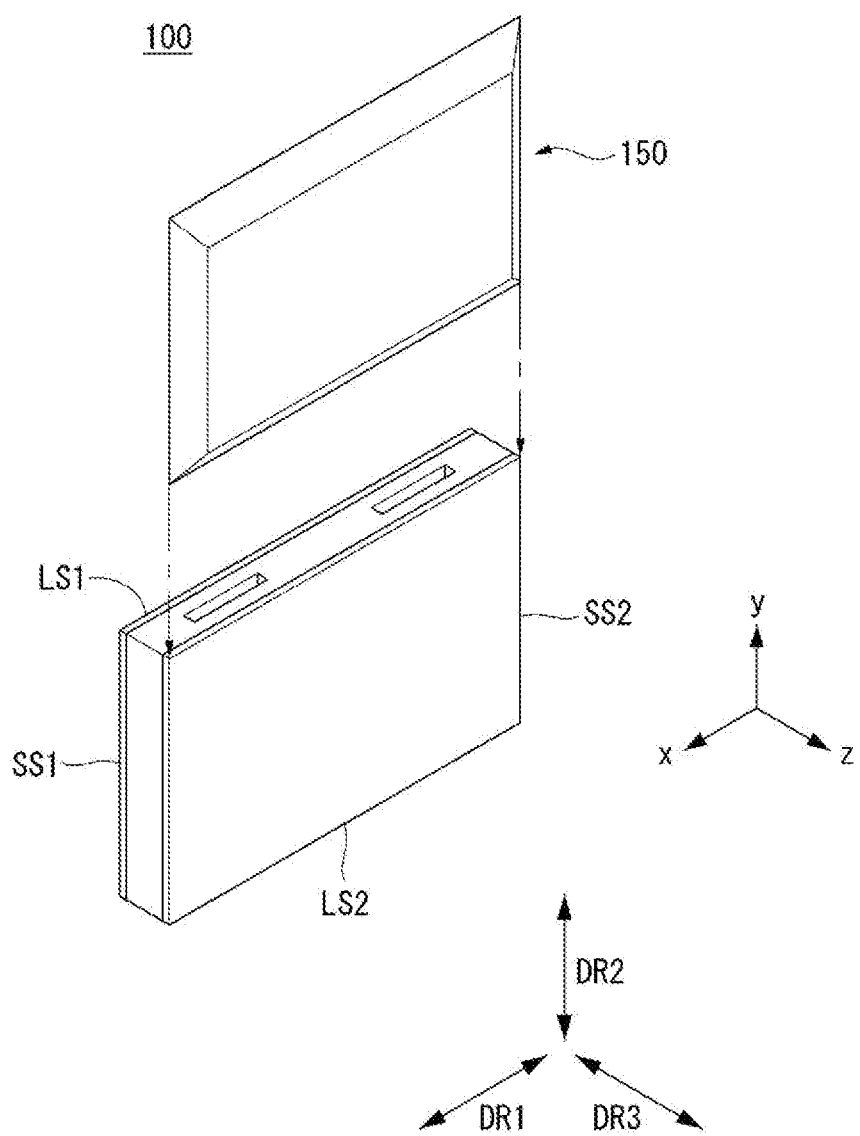

As shown in FIG. 2, a display device 100 according to an exemplary embodiment of the present invention can include a display panel 110 and a back cover 150 of the rear side of the display panel 110.

The back cover 150 can be connected to the display panel 110 with a sliding method in a direction toward the second long side LS2 from the first long side LS1, i.e., in the second direction DR2. In other words, the back cover 150 can be inserted with a sliding method into the first short side SS1 of the display panel 110, the second short side SS2 corresponding to the first short side SS1, and the first long side LS1 adjacent to the first short side SS1 and the second short side SS2 and located between the first short side SS1 and the second short side SS2.

In order to connect the back cover 150 to the display panel 110 with a sliding method, in the back cover 150 and/or other structures adjacent thereto, a protruding portion, a sliding portion, and a coupler can be included.

Figure 3:
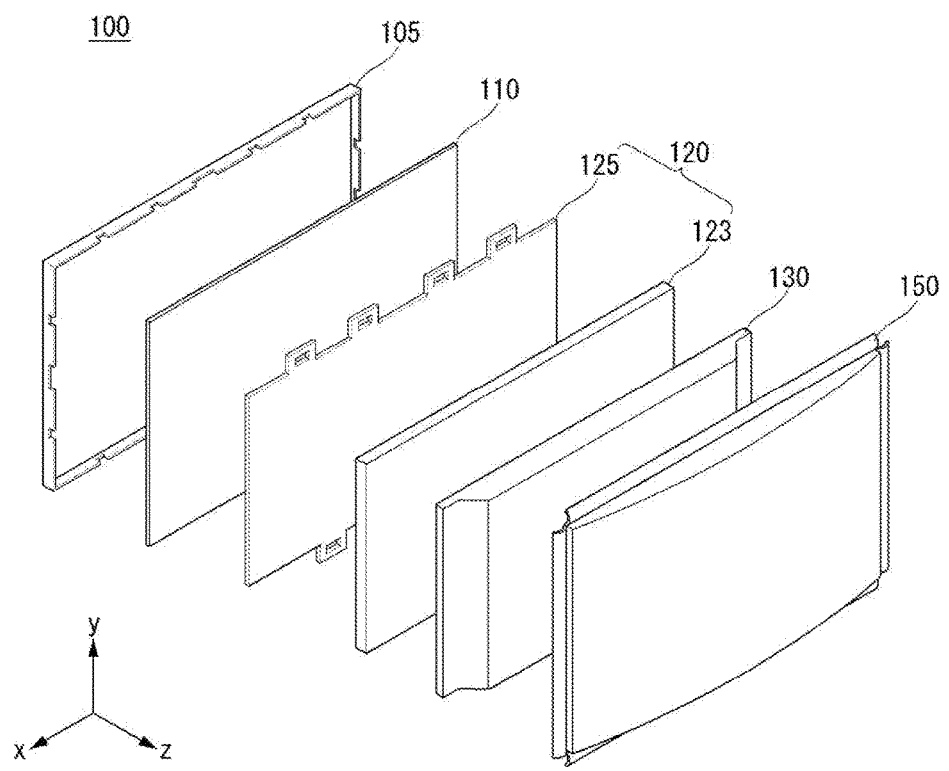

As shown in FIG. 3, the display device 100 according to an exemplary embodiment of the present invention can include a front cover 105, a display panel 110, a backlight unit 120, a frame 130, and a back cover 150.

The front cover 105 can cover at least a partial area of a front surface and a side surface of the display panel 110. The front cover 105 can have a quadrangular frame shape whose center is hollow. Because the center of the front cover 105 is hollow, an image of the display panel 110 can be displayed to the outside.

The front cover 105 can be divided into a front surface cover and a side surface cover. That is, the front cover 105 can be divided into a front surface cover located at the front surface side of the display panel 110 and a side surface cover located at the side surface side of the display panel 110. The front surface cover and the side surface cover can be separately formed. Any one of the front surface cover and the side surface cover can be omitted. For example, for an enhanced design, only the side surface cover can exist without the front surface cover.

The display panel 110 can be provided at a front surface of the display device 100 to display an image. The display panel 110 can divide an image into a plurality of pixels to output the image to correspond to a color, brightness, and chroma per each pixel. The display panel 110 can be divided into an active area that displays an image and an inactive area that does not display an image. The display panel 110 can include a front substrate and rear substrate opposite to each other with a liquid crystal layer interposed therebetween.

The front substrate can include a plurality of pixels formed with red R, green G, and blue B sub pixels. The front substrate can generate an image corresponding to a red color, a green color, or a blue color according to a control signal.

The rear substrate can include switching elements. The rear substrate can switch a pixel electrode. For example, the pixel electrode can change the molecular arrangement of the liquid crystal layer according to a control signal applied from the outside. The liquid crystal layer can include a plurality of liquid crystal molecules. The liquid crystal molecules may change arrangement to correspond to a voltage difference that has occurred between a pixel electrode and a common electrode. The liquid crystal layer can transfer light provided from the backlight unit 120 to the front substrate.

The backlight unit 120 can be located at the rear surface side of the display panel 110. The backlight unit 120 can include a plurality of light sources. A light source of the backlight unit 120 can be disposed in a direct type or an edge type. When the backlight unit 120 is the direct type backlight unit 120, a diffusion plate can be further included.

The backlight unit 120 can be coupled to a front surface and a side surface of the frame 130. For example, a plurality of light sources can be disposed at the inside of one side of the frame 130, and in this instance, the backlight unit can be referred to as an edge type backlight unit.

The backlight unit 120 can be driven with an entire driving method or a partial driving method such as local dimming and impulsive. The backlight unit 120 can include an optical sheet 125 and an optical layer 123.

The optical sheet 125 can enable light of a light source to be uniformly transferred to the display panel 110. The optical sheet 125 can be formed with a plurality of layers. For example, the optical sheet 125 can include at least one prism sheet and/or at least one diffusion sheet.

In the optical sheet 125, at least one coupler 125d can exist. The coupler 125d can be coupled to the front cover 105 and/or the back cover 150. That is, the coupler 125d can be directly coupled to the front cover 105 and/or the back cover 150. Alternatively, the coupler 125d can be coupled to a structure coupled on the front cover 105 and/or the back cover 150. That is, the coupler 125d can be indirectly coupled to the front cover 105 and/or the back cover 150.

The optical layer 123 can include a light source. A detailed configuration of the optical layer 123 will be described in a corresponding portion.

The frame 130 can perform a function of supporting constituent elements of the display device 100. For example, constituent elements of the backlight unit 120 can be coupled to the frame 130. The frame 130 can be made of a metal material such as an aluminum alloy.

The back cover 150 can be located at a rear surface of the display device 100. The back cover 150 can protect internal constituent elements from an external impact. At least a portion of the back cover 150 can be coupled to the frame 130 and/or the front cover 105. The back cover 150 can be an injection material made of a resin material.

Figure 4:
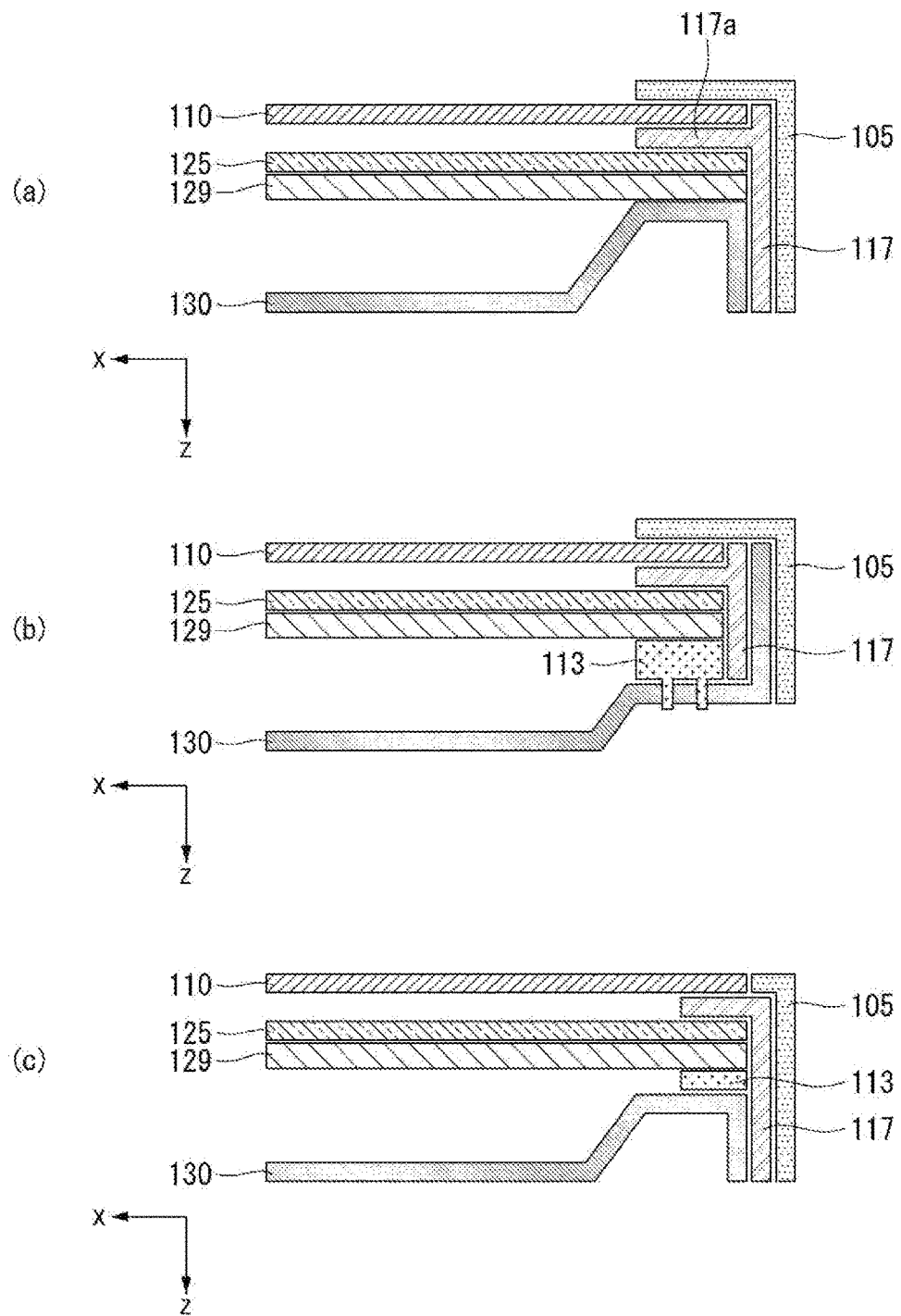
Figure 5:
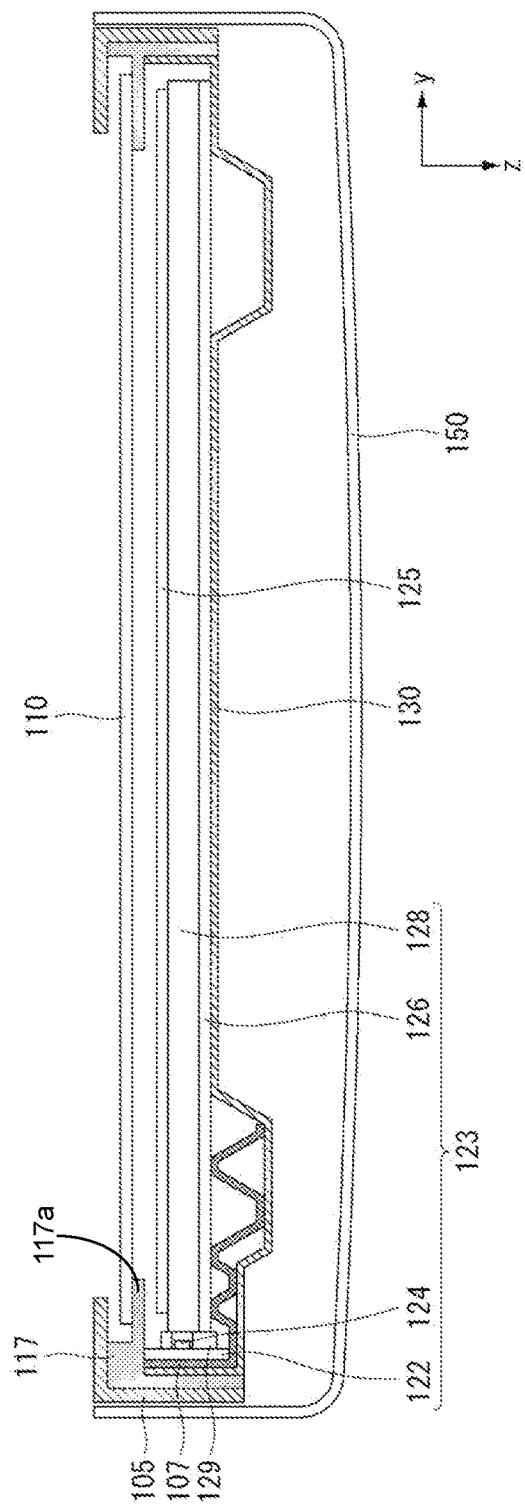
Figure 6:
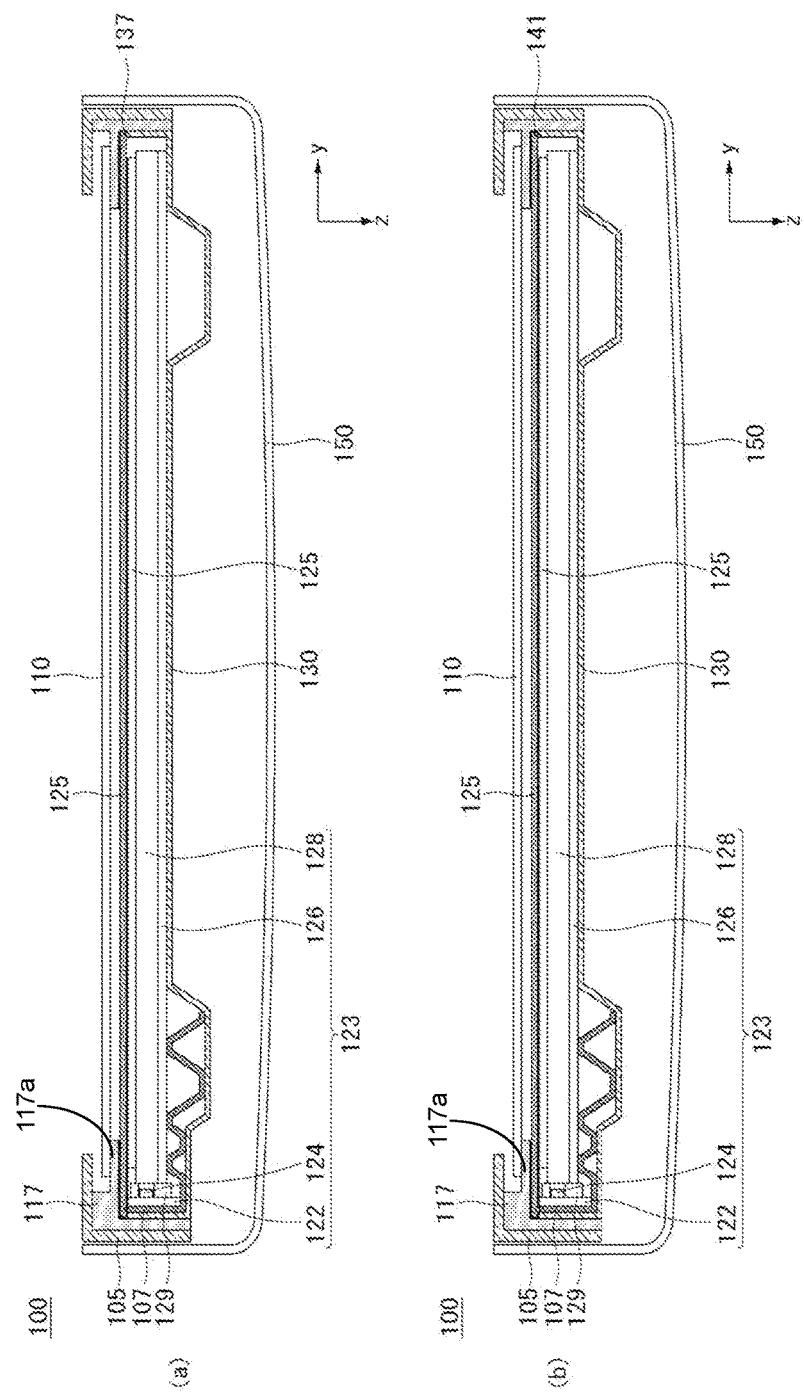

FIGS. 4 and 5 are views illustrating a configuration of the optical sheet 125.

As shown in FIG. 4(a), at an upper portion of the frame 130, the optical sheet 125 may be located. The optical sheet 125 can be coupled to the frame 130 at an edge of the frame 130. The optical sheet 125 can be directly received at an edge of the frame 130. That is, the optical sheet 125 can be supported by the frame 130. An upper surface of an edge of the optical sheet 125 can be enclosed by a first guide panel 117. For example, the optical sheet 125 can be located between an edge of the frame 130 and a flange 117a of the first guide panel 117.

The display panel 110 can be located at the front surface side of the optical sheet 125. An edge of the display panel 110 can be coupled to the first guide panel 117. That is, the display panel 110 can be supported by the first guide panel 117.

An edge area of the front surface of the display panel 110 can be enclosed by the front cover 105. For example, the display panel 110 can be located between the first guide panel 117 and the front cover 105.

As shown in FIG. 4(b), the display device 100 according to an exemplary embodiment of the present invention can further include a second guide panel 113. The optical sheet 125 can be coupled to the second guide panel 113. That is, the second guide panel 113 can be coupled to the frame 130, and the optical sheet 125 can be coupled to the second guide panel 113. The second guide panel 113 can be made of a material different from that of the frame 130. The frame 130 can have a form that encloses the first and second guide panels 117 and 113.

As shown in FIG. 4(c), in the display device 100 according to an exemplary embodiment of the present invention, the front cover 105 may not cover a front surface of the display panel 110. That is, one end portion of the front cover 105 can be located at a side surface of the display panel 110.

As shown in FIG. 5, the optical layer 123 can include a substrate 122, a reflection sheet 126, a light assembly 124, and a light guide plate 128.

The optical layer 123 can be located on the frame 130. For example, the optical layer 123 can be located between the frame 130 and the optical sheet 125. The optical layer 123 can be supported by the frame 130. In order to support the optical layer 123, at least one portion of the frame 130 can contact the optical layer 123.

At least another portion of the frame 130 can be bent to protrude in an opposite direction of the optical layer 123. For example, both sides of the frame 130 can be protruded in an opposite direction of the optical layer 123 (e.g., in a direction away from optical layer 123). That is, the frame 130 can be formed with one or more bends or ridges, or have corrugated property. Accordingly, rigidity of the frame 130 can be enhanced.

The substrate 122 can be located in at least one side of the inside of the frame 130. The substrate 122 can be coupled to a housing 107 located between the substrate 122 and the frame 130. The substrate 122 can be directly coupled to the housing 107. For example, the substrate 122 can have a form coupled to at least one of the first guide panel 117, the frame 130, the front cover 105, and the housing 107.

The housing 107 can be located at one side to which the substrate 122 is coupled within the frame 130. The housing 107 can be bent at least one time from one side of the frame 130 to extend to a lower surface within the frame 130. A portion extended to a lower surface of the housing 107 can support the reflection sheet 126. For example, a portion extended to a lower surface of the housing 107 can support one side of the reflection sheet 126, and the frame 130 can support a central portion of the reflection sheet 126. A portion extended to a lower surface of the housing 107 can be bent to protrude in a direction toward the reflection sheet 126 in order to support the reflection sheet 126.

The substrate 122 can be located in a side surface direction of the reflection sheet 126 and/or the light guide plate 128 (e.g., at the side for an edge-lit type backlight). That is, a front surface of the substrate 122 can face toward the optical layer 123.

On the substrate 122, the light assembly 124 can be mounted. The light assembly 124 can be located in a side surface direction of the light guide plate 128. That is, light emitted from the light assembly 124 can advance toward the light guide plate 128.

The substrate 122 and the reflection sheet 126 and/or the light guide plate 128 can be separated by a predetermined gap. The light assembly 124 and the reflection sheet 126 and/or the light guide plate 128 can be separated by a predetermined gap. The light assembly 124 can be separated from the reflection sheet 126 and/or the light guide plate 128 by a dam pad 129 located on the substrate 122. That is, a height of the light assembly 124 in a direction toward the light guide plate 128 can be less than that of the dam pad 129 in a direction toward the light guide plate 128. Because the light assembly 124 is separated from the reflection sheet 126 and/or the light guide plate 128, the light assembly 124 may not erroneously operate or a function thereof may not be weakened. A detailed configuration of the substrate 122 and the optical layer 123 may be described in a corresponding portion.

The optical sheet 125 can be located between the optical layer 123 and the display panel 110. The optical sheet 125 can be guided on the optical layer 123 by the first guide panel 117. The optical sheet 125 can be coupled to a rear surface of the flange 117a of the first guide panel 117.

The display panel 110 can be located at a front surface of the optical sheet 125. A location of the display panel 110 can be guided into place by the first guide panel 117. The display panel 110 can be coupled to a front surface of the flange 117a of the first guide panel 117 (e.g., at the viewer side).

As shown in FIG. 6(a), in the display device 100 according to an exemplary embodiment of the present invention, the optical sheet 125 can be coupled and fixed to the frame 130. Specifically, the optical sheet 125 can be coupled and fixed to a fixing portion 137 of the frame 130 (e.g., an inner corner, or inner notched area or groove).

The fixing portion 137 can be provided at a side wall of the frame 130. The fixing portion 137 can be protruded from the side wall of the frame 130 in a direction toward an optical sheet. The fixing portion 137 located at both side walls of the frame 130 can fix both sides of the optical sheet 125.

As shown in FIG. 6(b), in the display device 100 according to an exemplary embodiment of the present invention, the frame 130 and the optical sheet 125 can be coupled and fixed through a mold 141. That is, the mold 141 can be coupled to a side wall of the frame 130, and the optical sheet 125 can be coupled to the mold 141.

In the display device according to an exemplary embodiment of the present invention, as the optical sheet 125 is directly coupled to the frame 130 instead of the first guide panel 117, the optical sheet 125 can be more strongly fixed to a front surface of the optical layer 123.

Figure 7:
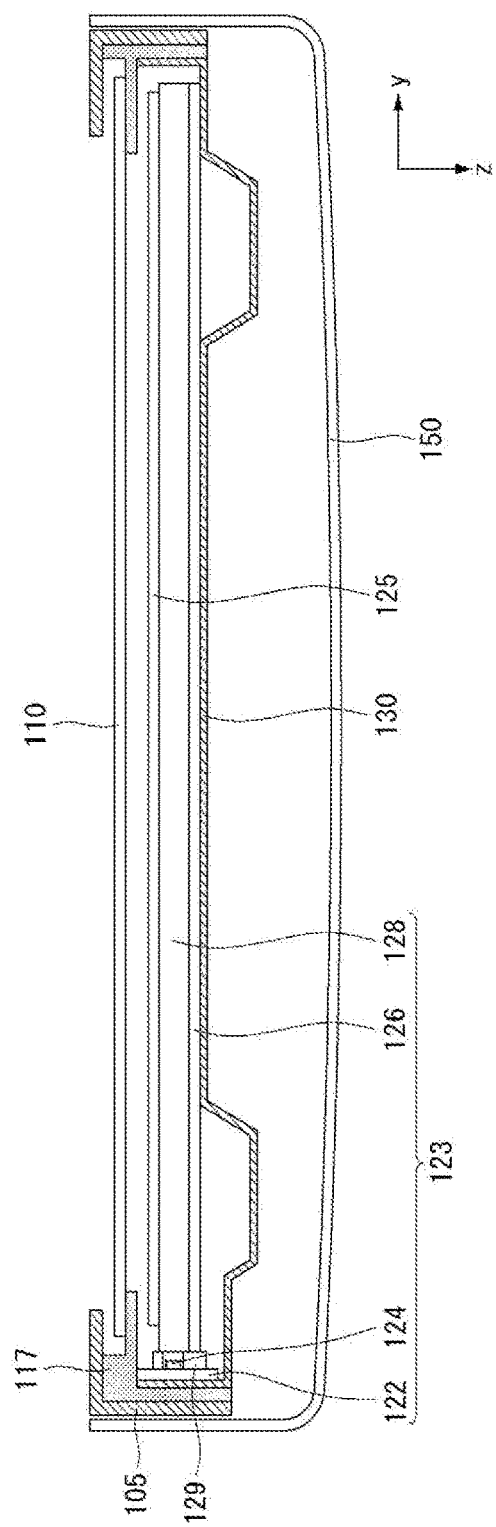

Referring to FIG. 7, in the display device 100 according to an exemplary embodiment of the present invention, the substrate 122 can be directly coupled on the frame 130.

Because the frame 130 is directly coupled to the substrate 122, the frame 130 can support both sides of the optical layer 123. In order to support the reflection sheet 126, a portion of the frame 130 corresponding to both ends of the reflection sheet 126 of a lower surface of the frame 130 can protrude in a direction toward the reflection sheet 126.

Because the frame 130 and the substrate 122 are directly coupled without an intermediate material therebetween, the frame 130 can better utilize an internal space.

Figure 8:
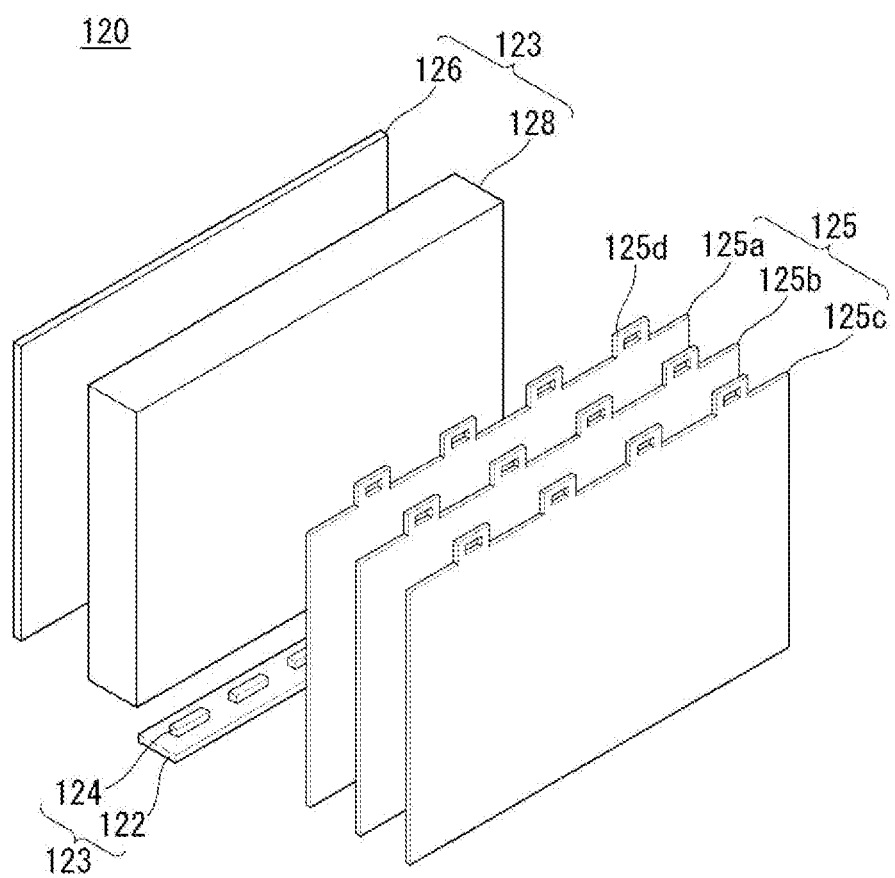
Figure 9:
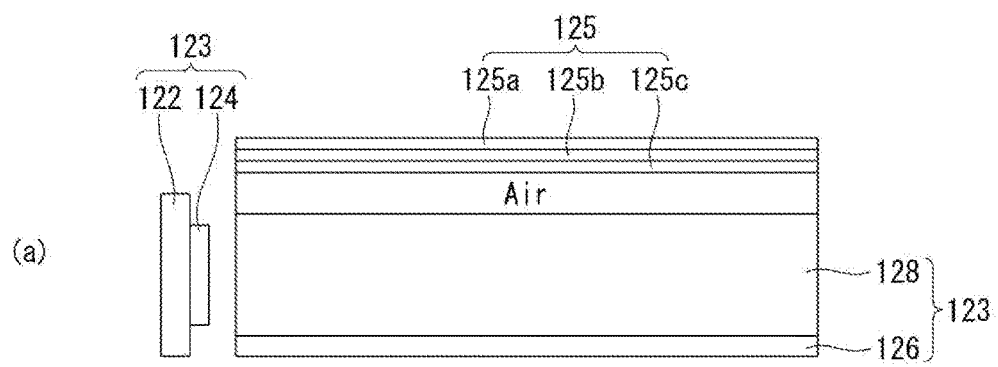
Figure 9:
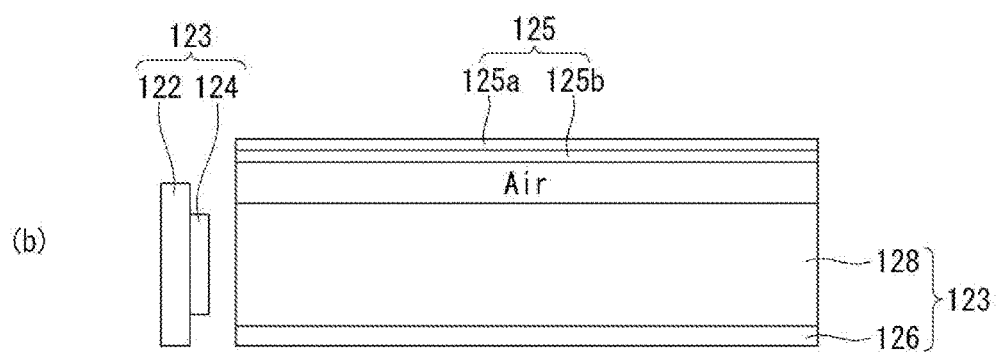

Referring to FIGS. 8 and 9, the backlight unit 120 can include a substrate 122, at least one light assembly 124, an optical layer 123 including a reflection sheet 126 and a light guide plate 128, and an optical sheet 125 located at the front surface side of the optical layer 123.

The substrate 122 can be located in at least one side of another configuration of the optical layer 123. The substrate 122 can extend in a direction orthogonal to a lengthwise direction of another configuration of the optical layer 123.

In the substrate 122, at least one light assembly 124 can be mounted. In the substrate 122, an electrode pattern for connecting an adaptor and the light assembly 124 can be formed. For example, in the substrate 122, a carbon nanotube electrode pattern for connecting the light assembly 124 and the adaptor can be formed.

The substrate 122 can be made of at least one of polyethyleneterephthalate (PET), glass, polycarbonate (PC), and silicon. The substrate 122 can be a Printed Circuit Board (PCB) that mounts at least one light assembly 124.

In the substrate 122, a plurality of light assemblies 124 can be disposed at a predetermined gap. A width of the light assembly 124 can be smaller than a thickness direction width of the light guide plate 128 (e.g., the side edge of the light guide plate can overlap both edges of the light assembly 124). Therefore, most of the light emitted from the light assembly 124 can be transferred to the inside of the light guide plate 128.

The light assembly 124 can be a Light Emitting Diode (LED) chip or an LED package including at least one LED chip.

The light assembly 124 can be formed with a color LED that emits at least one of a red color, a blue color, and a green color or a white LED. The color LED can include at least one of a red LED, a blue LED, and a green LED.

A light source included in the light assembly 124 can be a Chip On Board (COB) type light source. The COB type light source can have a form that directly couples an LED chip, which is a light source to the substrate 122. Therefore, a manufacturing process can be simplified. Further, resistance can be lowered and thus energy to be lost due to a heat can be reduced. That is, power efficiency of the light assembly 124 can be enhanced. The COB type light source can provide brighter lighting. The COB type light source can have a smaller thickness and a lighter weight than a conventional light source.

The light guide plate 128 can be located at an upper portion of the light assembly 124. The light guide plate 128 can perform a function of widely diffusing light applied from the light assembly 124. In the light guide plate 128, the light assembly 124 and an adjacent surface can be formed in a step shape. A lower surface of the light guide plate 128 is formed in a shape inclined upward to reflect light applied from the light assembly 124 upward.

The reflection sheet 126 can be located at the rear surface side of the light guide plate 128. The reflection sheet 126 can reflect light emitted from the light assembly 124 to the front surface side (e.g., toward the viewer). The reflection sheet 126 can also reflect light that may exit the rear side of the light guide plate 128 to the front surface side (e.g., toward the viewer).

The reflection sheet 126 can include at least one of a metal and metal oxide, which are a reflection material. For example, the reflection sheet 126 can include a metal and/or metal oxide having high reflectivity, such as at least one of aluminum (Al), silver (Ag), gold (Au), and titanium dioxide (TiO2).

The reflection sheet 126 can be formed by depositing and/or coating a metal or metal oxide. On the reflection sheet 126, ink including a metal material can be printed. In the reflection sheet 126, a deposition layer can be formed using a vacuum deposition method such as a heat deposition method, an evaporation method, or a sputtering method. In the reflection sheet 126, a coating layer and/or a print layer can be formed using a printing method, a gravure coating method, or a silk screen method.

At the front surface side of the light guide plate 128 (e.g., the viewer side), a diffusion plate can be further included. The diffusion plate can diffuse light emitted from the light guide plate 128 upward (e.g., toward the front side to the viewer).

An air gap can be formed between the light guide plate 128 and the optical sheet 125. The air gap can perform a buffer function of widely spreading light emitted from the light assembly 124. A resin can be deposited on the light assembly 124 and/or the reflection sheet 126. The resin can perform a function of diffusing light emitted from the light assembly 124.

The optical sheet 125 can be located at the front surface side of the light guide plate 128. A rear surface of the optical sheet 125 can come in close contact with the light guide plate 128, and a front surface of the optical sheet 125 can come in close contact with a rear surface of the display panel 110.

The optical sheet 125 can include at least one sheet. Specifically, the optical sheet 125 can include at least one prism sheet and/or at least one diffusion sheet. A plurality of sheets included in the optical sheet 125 can be in a bonding state and/or a close contact state.

The optical sheet 125 can be formed with a plurality of sheets having different functions. For example, the optical sheet 125 can include first to three optical sheets 125a to 125c. The first optical sheet 125a can have a function of a diffusion sheet, and the second and third optical sheets 125b and 125c can have a function of a prism sheet. The number and/or a location of diffusion sheets and prism sheets can be changed. For example, the optical sheet 125 can include the first optical sheet 125a, which is a diffusion sheet and the second optical sheet 125b, which is a prism sheet.

The diffusion sheet prevents light emitted from the light guide plate 128 from partially concentrating, thereby providing more uniform lumination. The prism sheet concentrates light emitted from the diffusion sheet to enable light to be applied to the display panel 110.

The coupler 125d can be formed in at least one of corners of the optical sheet 125. The coupler 125d can be formed in at least one of the first to third optical sheets 125a to 125c.

The coupler 125d can be formed at a corner of the long side of the optical sheet 125. The coupler 125d formed at the first long side and the coupler 125d formed at the second long side can be asymmetric. For example, a location and/or the number of the coupler 125d formed at the first long side and the coupler 125d formed at the second long side can be different.

Figure 10:
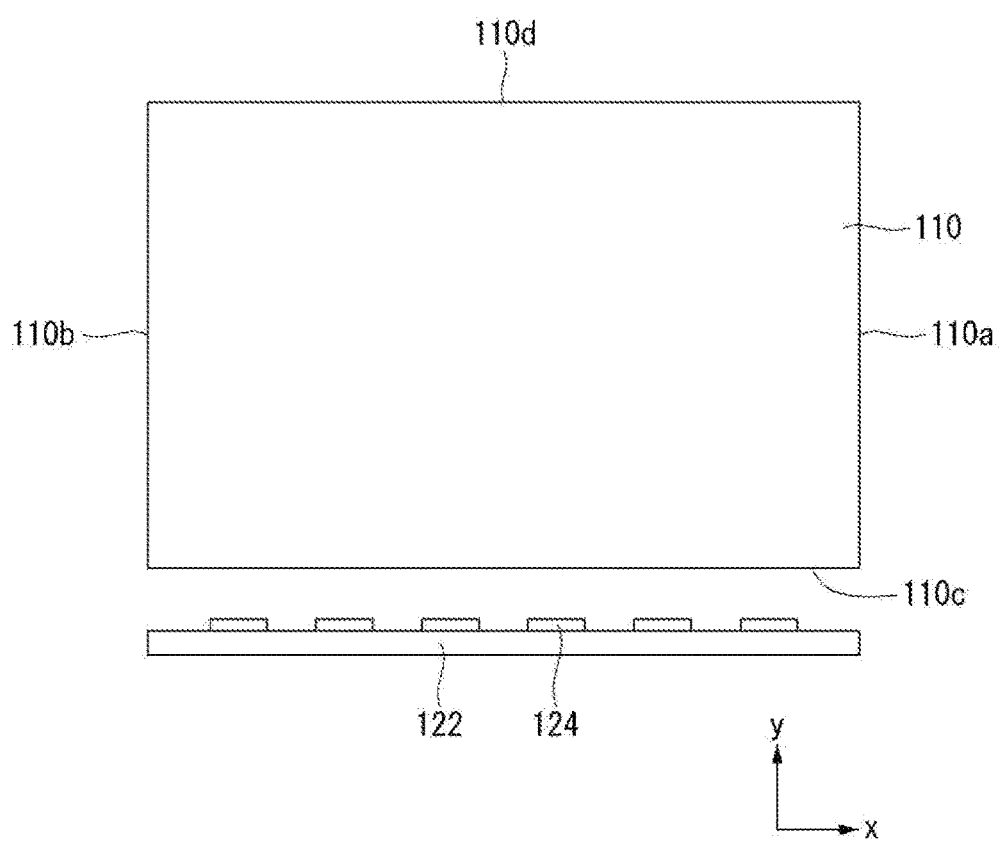
Figure 11:
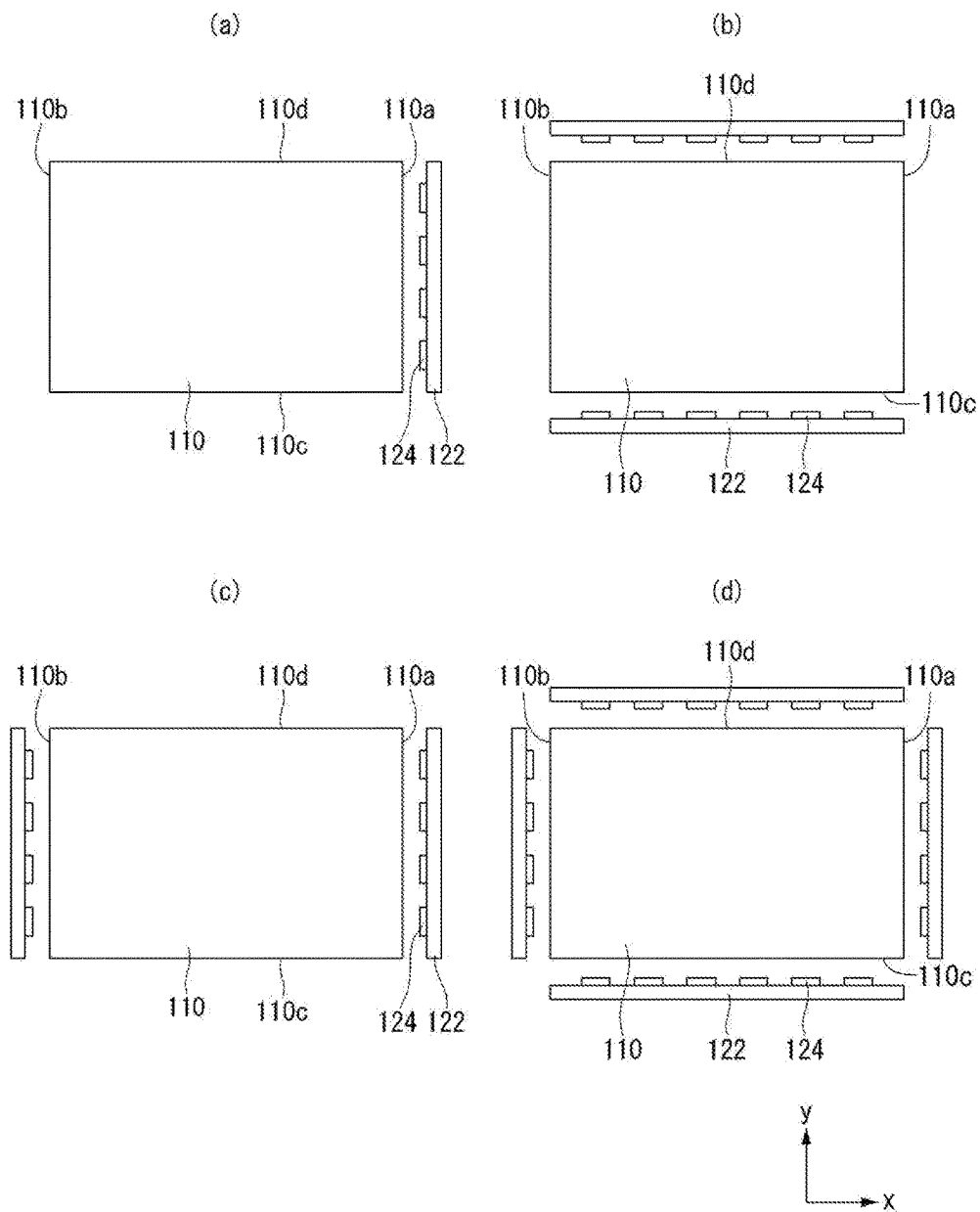

Referring to FIGS. 10 and 11, the substrate 122 and the light assembly 124 can be located at or near a lower side surface 110c of the display panel 110. A backlight unit in which the light assembly 124 is disposed at a side surface of the display panel 110 can be referred to as an edge type backlight unit.

As shown in FIG. 10, the light assembly 124 can emit light from the lower side surface 110c of the display panel 110 in a direction toward an upper side surface 110d. That is, light emitted from the light assembly 124 is diffused from the lower side surface 110c to the upper side surface 110d of the display panel 110 to fully illuminate the entire display panel 110. However, the present invention is not limited thereto and the light assembly 124 can be located at the upper side surface 110d of the display panel 110.

As shown in FIG. 11(a), the light assembly 124 can be located at a right side surface 110a of the display panel 110. However, the present invention is not limited thereto and the light assembly 124 can be located at a left side surface 110b of the display panel 110.

As shown in FIG. 11(b), the light assembly 124 can be located at the lower side surface 110c and the upper side surface 110d of the display panel 110. As shown in FIG. 11(c), the light assembly 124 can be located at the right side surface 110a and the left side surface 110b of the display panel 110.

As shown in FIGS. 11(b) and 11(c), a backlight unit in which the light assemblies 124 are disposed at opposing both ends of the display panel 110 is referred to as a dual type backlight unit. The dual type backlight unit can easily diffuse light to a front surface of the display panel 110 in even weak light.

As shown in FIG. 11(d), the light assembly 124 can be located along an entire outer edge surface of the display panel 110. When the light assembly 124 is located along an entire edge surface of the display panel 110, the quad type backlight unit can diffuse light more easily than other backlight units.

FIGS. 12 to 22 are views illustrating a configuration of a display device according to an exemplary embodiment of the present invention.

Figure 12:
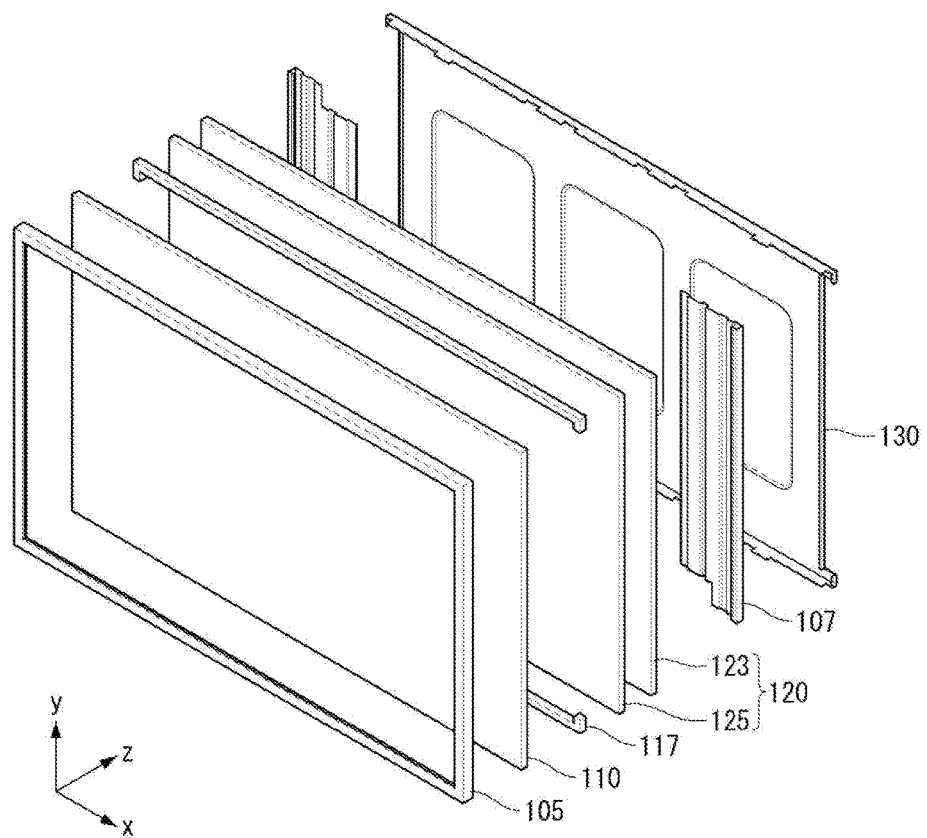
FIGS. 12 to 22 are views illustrating a configuration of a display device according to an embodiment of the present invention.
Figure 13:
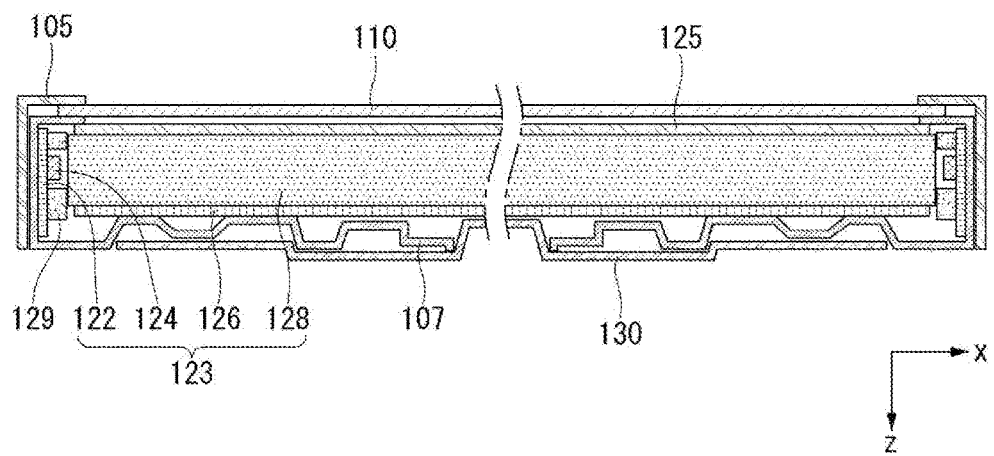

As shown in FIGS. 12 and 13, in the display device according to an exemplary embodiment of the present invention, the housing 107 can cover a side surface of both ends of the frame 130. That is, the housing 107 can form a side surface of the frame 130.

The housing 107 can extend from the outside of the frame 130 to an internal lower surface of the frame 130. A portion extended to the lower surface of the frame 130 can simultaneously support the frame 130 and the optical layer 123.

At least a portion of the lower surface of the housing 107 can be protruded to the outside of the frame 130. At least a portion of housing 107 that extends to a lower region can protrude to the outside of the frame 130 (e.g., the outer lower corners of housing 107). Accordingly, an area of the frame 130 can be smaller than the rear side of the display device.

The housing 107 can guide the display panel 110 and/or the optical sheet 125. That is, the display panel 110 and the optical sheet 125 can be coupled to the housing 107. A detailed structure of the housing 107 will be described later.

The first guide panel 117 can be located at a portion, except for the side at which the housing 107 is located. Accordingly, the first guide panel 117 can be divided into the plural. For example, the first guide panel 117 can be located at the upper side and the lower side of the display device 100.

As described above, because the housing 107 guides the display panel 110 and/or the optical sheet 125, the side at which the housing 107 is located may not require the first guide panel 117.

In the display device according to an exemplary embodiment of the present invention, the first guide panel 117 can be located at only the partial side. Accordingly, the display device can have a light weight. Further, a production cost can be reduced with a small material cost.

Further, in the display device according to an exemplary embodiment of the present invention, the first guide panel 117 can be separated into an upper portion and a lower portion. Accordingly, in the related-art, a set of first guide panels 117 were formed at one mold, however in the present invention, two sets of first guide panels 117 can be formed at one mold.

Figure 14:
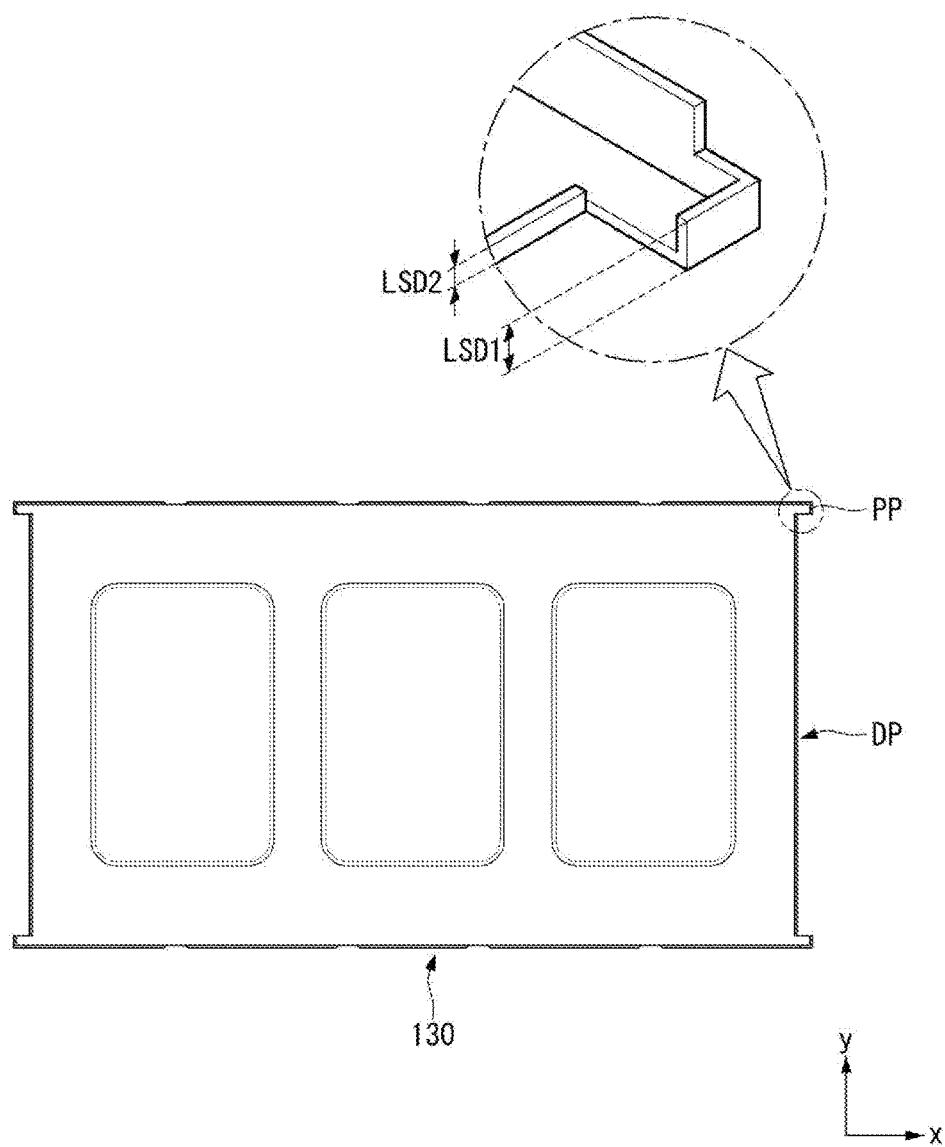

As shown in FIG. 14, in the frame 130, at both ends into which the housing (107 of FIG. 13) is inserted, a depressed portion DP is depressed toward a central portion of the frame 130 (e.g., the cut-out side portions). At edges of both sides of the frame 130, protruding portions PP can be disposed to define the depressed portions DP. Because the depressed portions DP are located at both ends of the frame 130, even if the housing is inserted, a side surface of the housing 107 does not protrude past the outer surface of the protruding portions, and the housing 107 and the frame 130 can provide a flush surface with each other, in order to maintain a rectangular shape.

The frame 130 can have a shape that covers a rear surface and a side surface of the display device. That is, the frame 130 can have a shape whose corner portion is extended in a front surface direction (e.g., toward the viewer).

A portion in which the depressed portion DP of the frame 130 is located can be a portion into which the housing 107 is inserted. Accordingly, in order to easily insert the housing, a height LSD2 that extends in a front surface direction of the depressed portion DP can be less than a height LSD1 that extends in a front surface direction of other corners of the frame 130.

Because the side in which the housing is located forms a side surface of the display device, an extended height of the frame 130 may be low.

In the display device according to an exemplary embodiment of the present invention, the depressed portion DP can be formed in the frame 130. Accordingly, the housing can be conveniently inserted into the frame 130.

Figure 15:
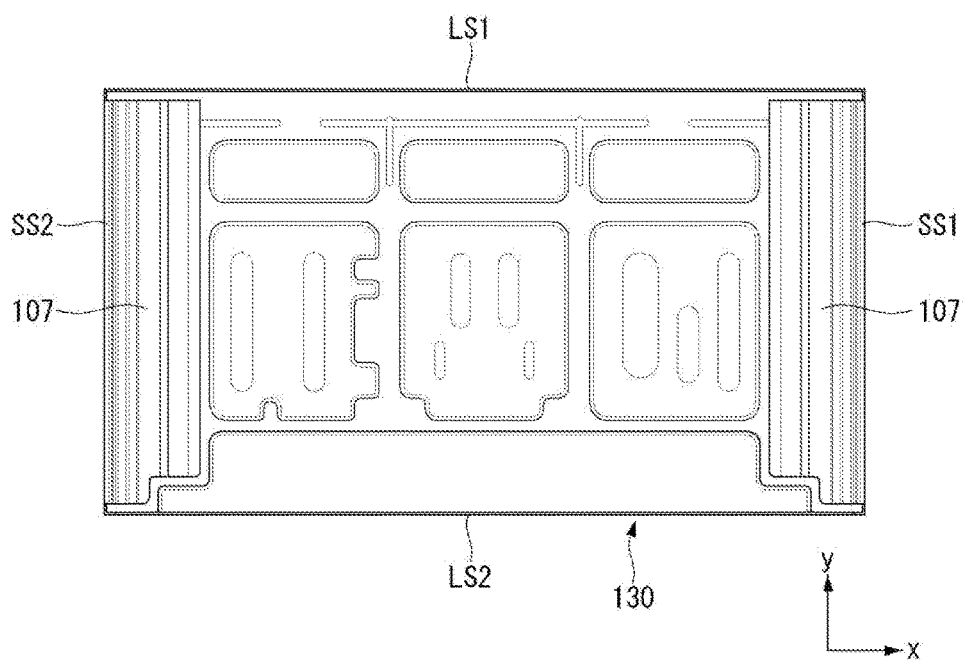

As shown in FIG. 15, the housing 107 can be inserted into the first and second short sides SS1 and SS2 of the display device. That is, the housing 107 can form the first and second short sides SS1 and SS2 of the frame 130.

As shown in FIG. 11(c), a light assembly mounted in the housing 107 can be disposed at opposite ends of the display panel. Accordingly, even with weak light, the light can be easily diffused across an entire surface of the display panel.

Further, because the first guide panel is coupled to the first and second long sides LS1 and LS2 in a bar shape, the first guide panel can be easier to produce and production cost can be reduced.

Figure 16:
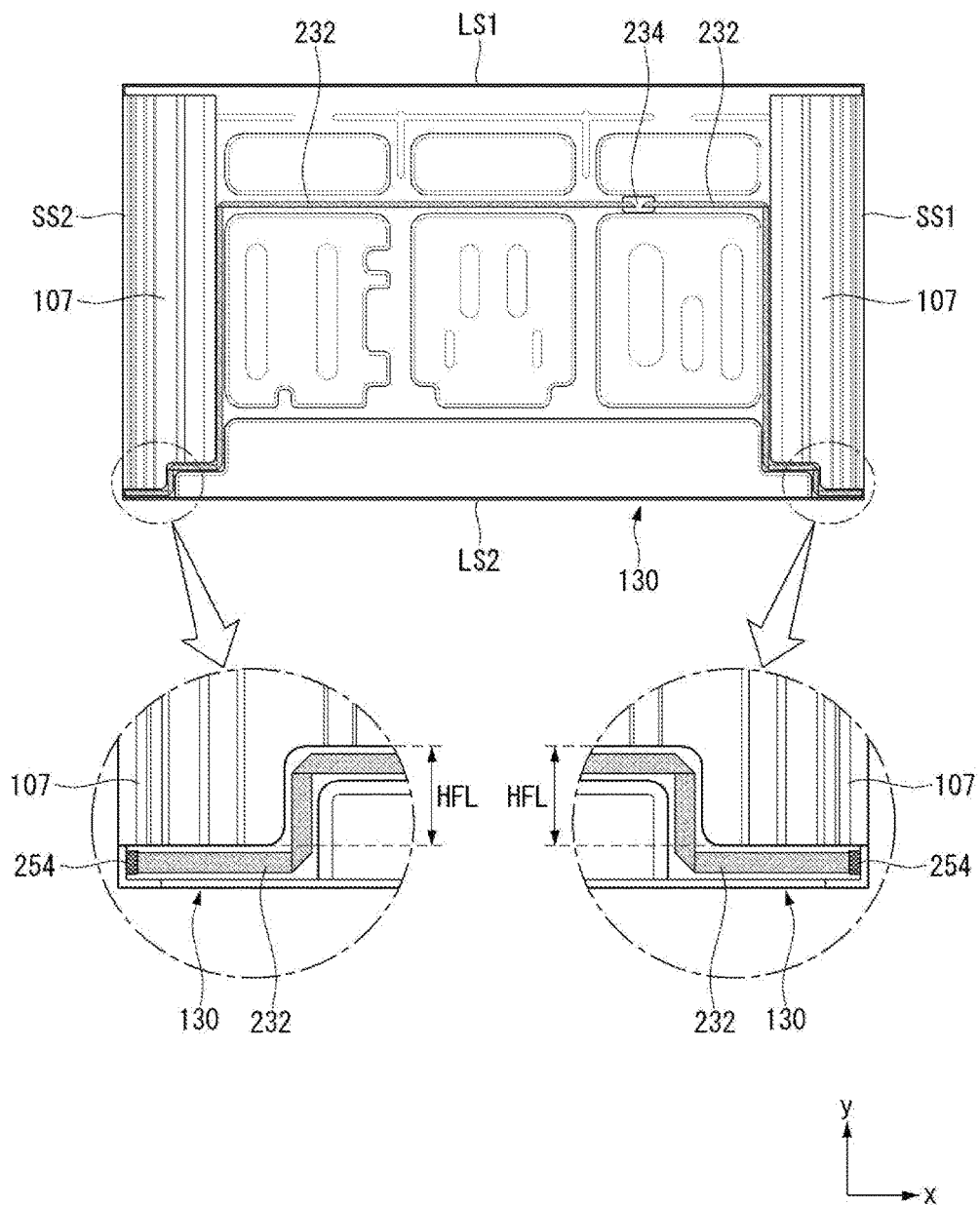
Figure 17:
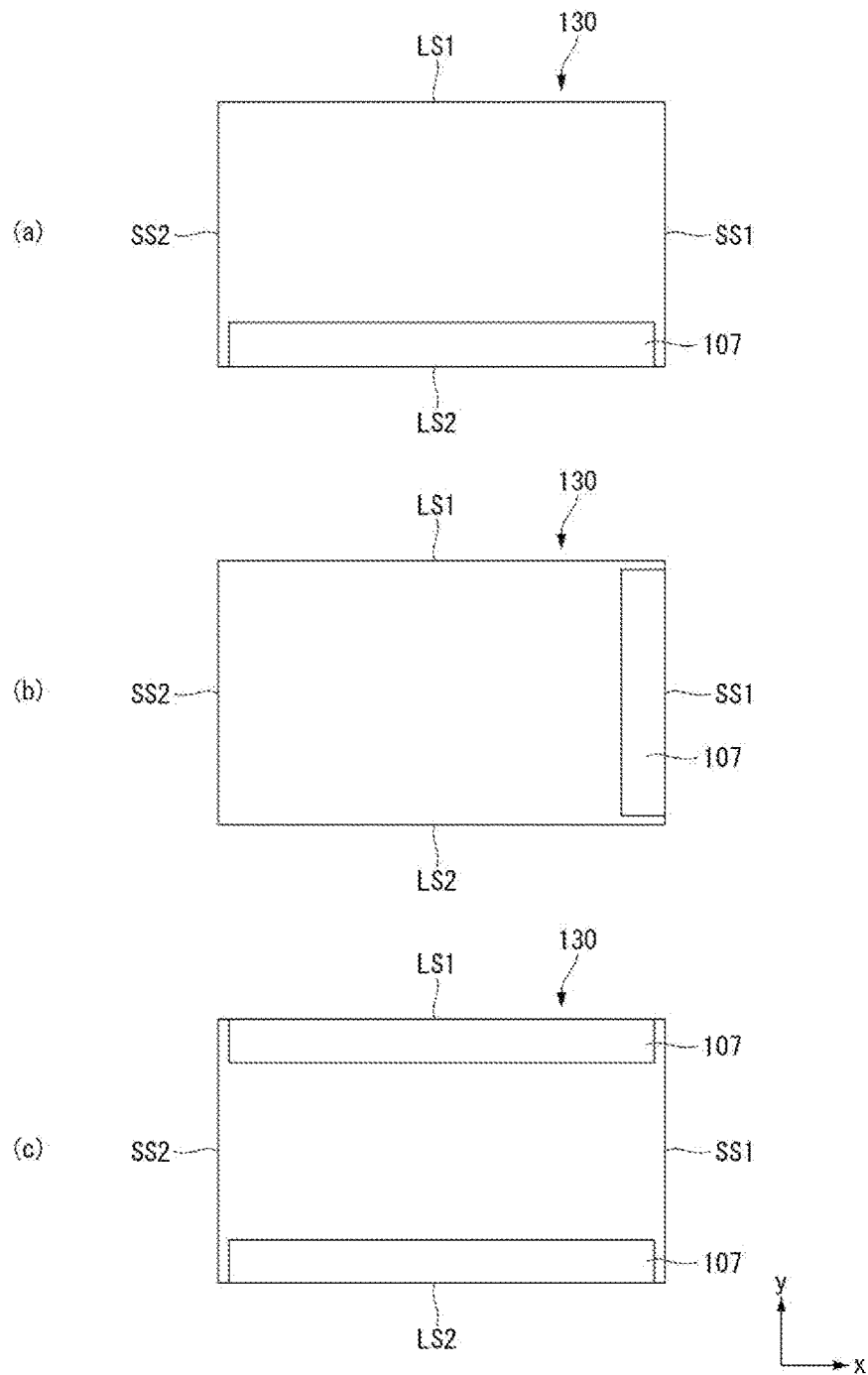

As shown in FIG. 16, one side surface of the housing 107 can be formed in a step portion. A portion in which one side surface of the housing 107 is far separated from a corner of the display device can be depressed to the inside by a predetermined length HFL than a portion adjacent to the corner.

Because a portion of the housing 107 is depressed to the inside, more space can be secure within the frame for a wiring electrode 232 and the display device can be made thinner. When a portion of the housing 107 is not depressed to the inside, the wiring electrode 232 may be located on a frame that is not formed to the inside, which would make the display device thicker.

One end of the wiring electrode 232 can be connected to at least one PCB located at the rear surface through a wiring hole 234 located at a central portion of the frame 130. The other end of the wiring electrode 232 can be connected to the outside through a hole of the housing 107. Since a connector 254 is located at the other end of the wiring electrode 232, electric connection to the outside can be easily performed.

In the drawing, a portion depressed toward the inside of the housing 107 is located at a lower side surface of the housing 107, but the present invention is not limited thereto and a portion depressed to the inside of the housing 107 can be located at an upper side surface of the housing 107.

As shown in FIG. 17(a), the housing 107 can be inserted into the second long side LS2 of the display device. As shown in FIG. 17(b), the housing 107 can be inserted into the first short side SS1 of the display device.

However, the present invention is not limited thereto and the housing 107 can be inserted into the first the long side LS1 or the second short side SS2 of the display device. In this instance, the light assembly can emit light from one side. Accordingly, because overlapping of light does not occur, compared with when the housings 107 are disposed at both sides, a bright spot or a dark spot can be avoided.

As shown in FIG. 17(c), the housing 107 can be inserted into the first and second long sides LS1 and LS2 of the display device. In this instance, the light assembly can be mounted over the long side rather than the first and second short sides SS1 and SS2. Accordingly, light emitted from the light assembly can be more easily diffused to the entire display panel.

Figure 18:
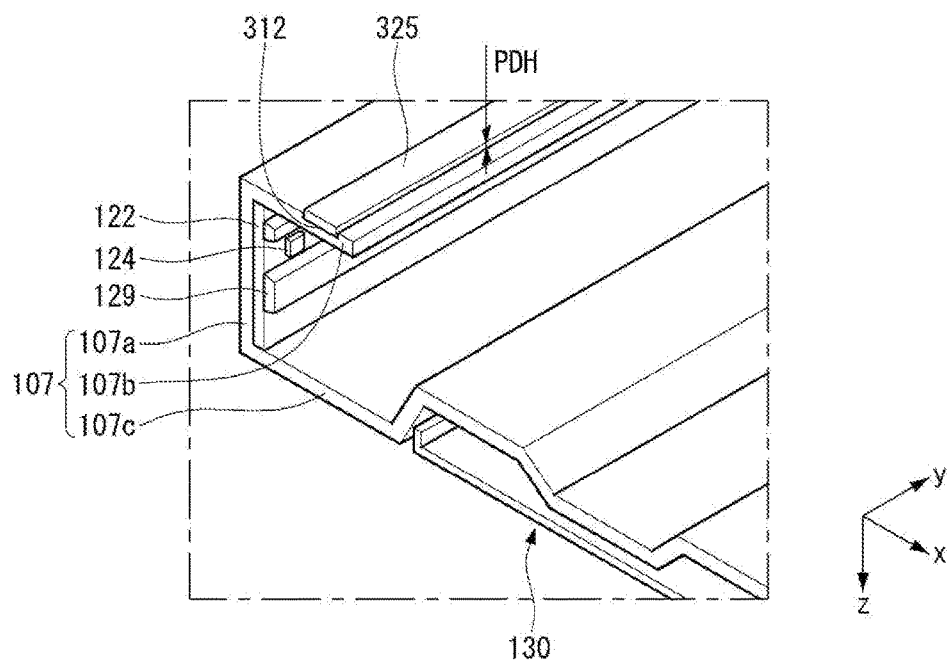

As shown in FIG. 18, the housing 107 can include first to third portions 107a, 107b, and 107c. The first portion 107a can be a portion in which the substrate 122 is mounted. The first portion 107a can be a portion extended in a front surface direction of the display device. As described above, the first portion 107a can form first and second short sides of the display device. The first portion 107a can form a side surface of the display device.

The second portion 107b can be a portion bent from the front end of the first portion 107a toward a central portion of the display device. That is, the second portion 107b can be a portion that extends to the central portion of the display device. The second portion 107b can be a portion that guides the display panel and/or the optical sheet.

The second portion 107b can include a mounting portion 312. The mounting portion 312 can be a portion depressed in a rear surface direction on the second portion 107b (e.g., mounting portion 312 can be a recessed area, channel or groove). The mounting portion 312 can be extended in a direction orthogonal to an extended direction of the second portion 107b.

A pad 325 can be inserted into the mounting portion 312. The pad 325 can come in close contact with the display panel to be coupled to the housing 107. Accordingly, the pad 325 can prevent a foreign substance and/or dust from entering between the display panel and other structure.

The pad 325 can have a larger thickness than a depressed thickness/depth of the mounting portion 312 (e.g., pad 325 can be thicker than the groove/channel). Accordingly, the pad 325 can be protruded by a predetermined height PDH that is higher than the second portion 107b. Because the pad 325 is protruded further than an upper surface of the second portion 107b, the pad 325 can come in close contact with the display panel.

The third portion 107c can be a portion bent from the rear end of the first portion 107a toward a central portion of the display device. That is, the third portion 107c can extend toward a lower surface within the frame 130. At least a portion of the third portion 107c can be inserted into the frame 130. The third portion 107c can be bent multiple times. That is, the third portion 107c can be formed with ridges or with corrugations. Accordingly, rigidity of the housing 107 can be enhanced.

Figure 19:
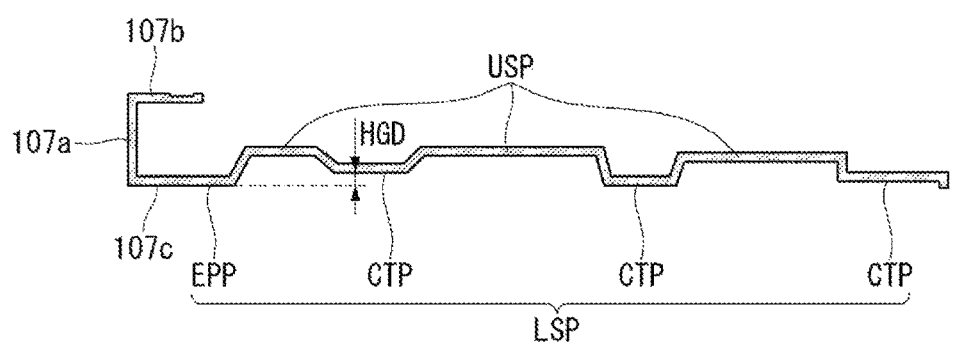
Figure 20:
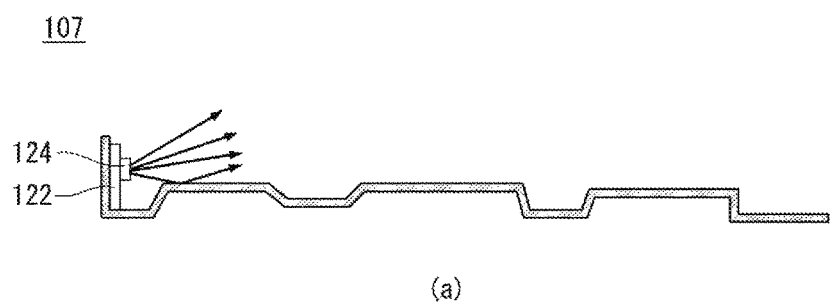
Figure 20:
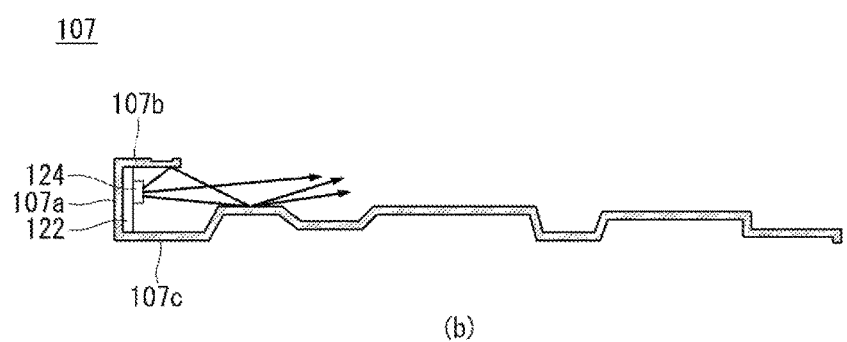

As shown in FIG. 19, in the housing 107, the third portion 107c can be bent multiple times. A portion bent multiple times can include a low end support portion LSP and an upper end support portion USP. The low end support portion LSP can protrude in a rear surface direction (e.g., away from the viewer toward the rear of the display device), and the upper end support portion USP can be a portion that protrudes in a front surface direction (e.g., toward the viewer). The upper end support portion USP can be a portion that supports an optical layer located in a front surface direction. Accordingly, an entire height of an upper surface of the upper end support portion USP may be the same (e.g., to provide level mounting surface or surfaces).

At least one portion of the low end support portion LSP can be a contact portion CTP supported by a frame located in a rear surface direction. At least another portion of the low end support portion LSP can be an exposed portion EPP exposed to the outside of the frame. The exposed portion EPP can be lower by a predetermined height HGD than the most adjacent contact portion CTP and extend to the same height as the frame (e.g., EPP and the back side of the frame can form a flush rear surface of the display device). Because the frame does not have a constant height due to forming, height of each of the contact portions CTP contacting the frame may not be the same.

As shown in FIG. 20(a), in the housing of the related-art, a second portion bent from the upper end to a central portion of the display device does not exist. Accordingly, light emitted from the light assembly 124 can be distributed to an upper portion instead of being concentrating/focused to a side surface of a light guide plate. In this instance, because light is not directly applied to the light guide plate, there is a problem that light efficiency may be deteriorated.

Alternatively, as shown in FIG. 20(b), in the housing 107 according to an embodiment of the present invention, because the second portion 107b is provided, by reflecting light advancing upward, light can be focused/concentrated to a side surface of the light guide plate. Accordingly, because more light is applied to the light guide plate, light efficiency can be enhanced.

Figure 21:
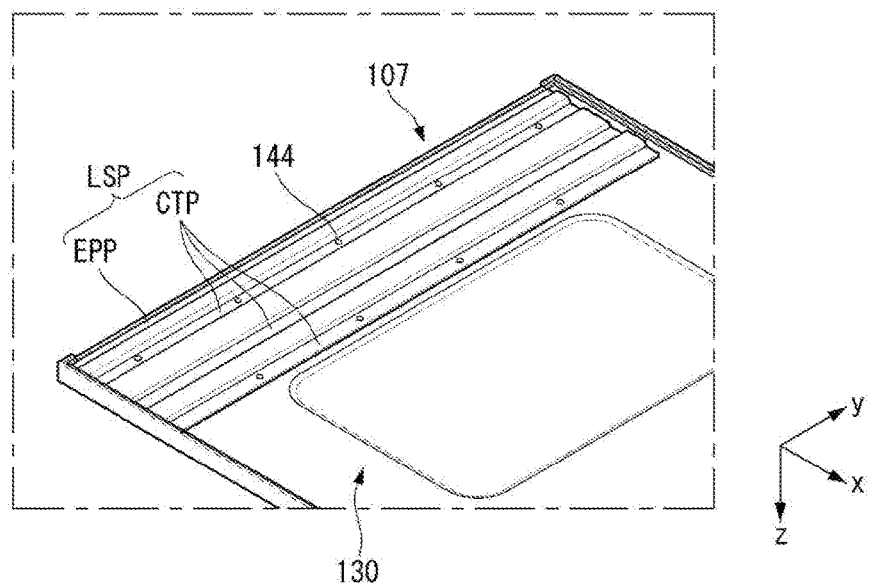

As shown in FIG. 21, the housing 107 can be coupled to the frame 130 through a screw 144. Specifically, the low end support portion LSP of the housing 107 and the frame 130 can be coupled to each other with a screw. Because the contact portion CTP of the low end support portion LSP of the housing 107 contacts the frame 130, the contact portion CTP and the frame 130 can be easily coupled through the screw 144.

Figure 22:
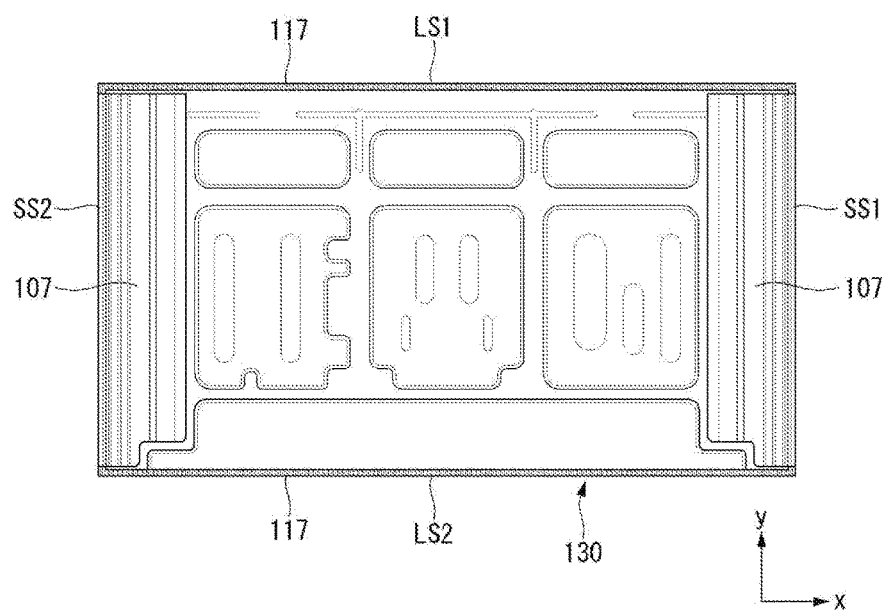

As shown in FIG. 22, the first guide panel 117 can be coupled on the first and second long sides LS1 and LS2 of the frame 130 in which the housing 107 is not located. Both ends of the first guide panel 117 can be bent in an orthogonal direction. Accordingly, the first guide panel 117 can be more easily coupled to the housing 107.

Figure 23:
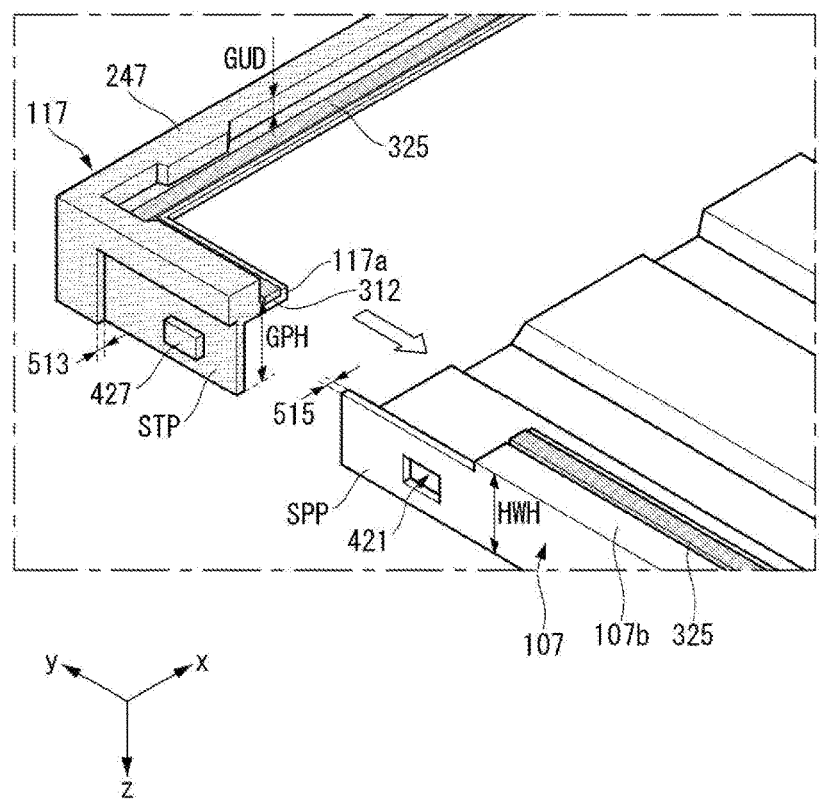
FIGS. 23 and 24 are views illustrating a coupling relationship of a guide panel and a housing.
Figure 24:
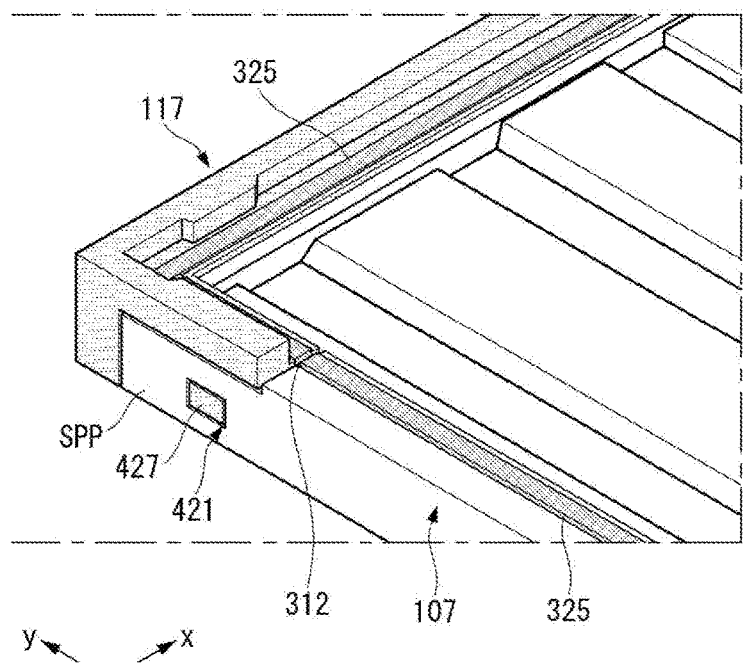

FIGS. 23 and 24 are views illustrating a coupling relationship of a guide panel and a housing.

As shown in FIGS. 23 and 24, one end of the first guide panel 117 can be coupled to one end of the housing 107. Specifically, a bent portion of one end of the first guide panel 117 and one end of the housing 107 can be coupled to each other.

At an external side surface of the bent portion of the first guide panel 117, a slide portion STP depressed toward the inside may be provided. Because the slide portion STP is depressed further than other portions of the first guide panel 117, a portion of the housing 107 can be conveniently and securely coupled.

At one end of the housing 107, an insertion portion SPP that protrudes toward the first guide panel 117 can be provided. A thickness 515 of the insertion portion SPP can be the same as a depressed thickness/depth 513 of the slide portion STP. Accordingly, even if the insertion portion SPP and the slide portion STP are coupled, a portion can be naturally extended without protrusion (e.g., to provide a flush surface). The insertion portion SPP can be coupled to the slide portion STP, in a flush manner. Specifically, the latch 427 of the slide portion STP can be inserted into and coupled to an insertion hole 421 of the insertion portion SPP.

A height GPH of the flange 117a of the first guide panel 117 can be the same as a height HWH of the second portion 107b of the housing 107. Accordingly, when the first guide panel 117 and the housing 107 are coupled, an upper surface of the flange 117a and an upper surface of the second portion 107b can be naturally connected without protrusion (e.g., flush). Further, the mounting portion 312 can be connected to a portion in which the flange 117a contacts the second portion 107b. Because heights of upper surfaces of the flange 117a and the second portion 107b are the same, a height of the pad 325 can be the same. Accordingly, the pad 325 can come in close contact with the display panel 110 and can be coupled to the display panel 110. That is, a foreign substance or dust can be prevented from penetrating between the display panel 110 and another element.

In order to enclose a side surface of the display panel, the first guide panel 117 can include a guide portion 247 protruded in a front surface direction. The guide portion 247 can be protruded by a predetermined distance GUD in a front surface direction further than other portions of the first guide panel 117. By enclosing a side surface of the display panel, the guide portion 247 can prevent the display panel from being separated. The guide portion 247 can be located at a bent portion of one end of the first guide panel 117. Accordingly, the first guide panel 117 can guide the short side of the display panel as well as the long side of the display panel. This can compensate the second portion 107*b* having no portion protruded in a front surface direction.

The foregoing embodiments are merely examples and are not to be considered as limiting the present disclosure. The present teachings can be readily applied to other types of methods and apparatuses. The features, structures, methods, and other characteristics of the embodiments described herein can be combined in various ways to obtain additional and/or alternative embodiments.

Certain embodiments or other embodiments of the invention described above are not mutually exclusive or distinct from each other. Any or all elements of the embodiments of the invention described above can be combined or combined with each other in configuration or function.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a display panel having a first edge and a second edge connected to the first edge;
   a frame positioned behind the display panel;
   a light guide plate positioned behind the display panel;
   a housing positioned behind the display panel, extended along the first edge and including a first portion supporting a rear surface of the display panel and a second portion extended rearwardly from the first portion, the second portion covering a side surface of the light guide plate;
   a substrate positioned between the second portion and the light guide plate;
   a light assembly mounted on the substrate; and
   a guide panel positioned behind the display panel, extended along the second edge and supporting the rear surface of the display panel.

2. The display device of claim 1, wherein the guide panel is coupled to a long side of the frame to support a major axis of the display panel, and
   wherein the housing is coupled to a short side of the frame to support a minor axis of the display panel.

3. The display device of claim 2, wherein the guide panel has both ends bent in a short side direction of the frame.

4. The display device of claim 3, wherein a bent portion of the guide panel is coupled to one end of the housing.

5. The display device of claim 1, wherein the frame comprises a depressed portion depressed toward a central portion of the frame at an insertion side of the housing, and
   wherein the depressed portion is bent toward a front surface direction of the display device.

6. The display device of claim 5, wherein a height of the depressed portion in the front surface direction of the display device is less than a height of another portion of the frame that is bent in the front surface direction of the display device.

7. The display device of claim 1, wherein the housing comprises
a third portion that is bent from a rear end of the first portion toward a central portion of the frame.

8. The display device of claim 7, wherein the display panel is received on the second portion of the housing.

9. The display device of claim 7, wherein the guide panel comprises a flange that protrudes toward the central portion of the frame, and
   wherein a distance from the display panel to an upper surface of the flange is the same as a distance from the display panel to an upper surface of the second portion of the housing.

10. The display device of claim 7, wherein the guide panel comprises a flange that protrudes toward the central portion of the frame,
    wherein the flange and the second portion of the housing comprise a mounting portion depression, and
    wherein the mounting portion depression is disposed at a location where the flange contacts the second portion of the housing.

11. The display device of claim 7, wherein the second portion comprises a mounting portion depression, and
    wherein the second portion further comprises a pad inserted into the mounting portion depression.

12. The display device of claim 11, wherein the pad protrudes further than an upper surface of the second portion of the housing by a predetermined height.

13. The display device of claim 1, wherein at least a portion of a side surface of the housing is depressed toward an inside of the display device.

14. The display device of claim 1, wherein a bottom surface of the housing comprises:
    an upper end support portion that protrudes in a front surface direction of the display device; and
    a low end support portion the protrudes in a rear surface direction of the display device,
    wherein at least one portion of the low end support portion comprises a contact portion supported by the frame, and
    wherein at least another portion of the low end support portion comprises an exposed portion that is exposed to an outside of the frame.

15. The display device of claim 14, wherein the contact portion of the low end support portion of the housing includes a plurality of contact areas, and
    wherein the exposed portion of the low end support portion of the housing is lower than a contact area among the plurality of contact areas that is most adjacent to the exposed portion of the low end support portion of the housing.

16. The display device of claim 14, wherein a rear surface of the exposed portion of the low end support portion of the housing is flush with a rear surface of the frame, and
    wherein the rear surface of the exposed portion together with the rear surface of the frame form a back side of the display device.

17. The display device of claim 1, wherein the housing includes a first housing portion and a second housing portion disposed at opposite sides of the frame, and
    wherein the first housing portion and the second housing portion are corrugated with alternating bends that extend parallel to short sides of the display device.

18. A display device, comprising:
    a frame;
    a reflection sheet disposed on the frame;
    a housing coupled to at least one side of the frame;
    a substrate disposed on the housing;
    a light assembly mounted on the substrate;

a light guide plate disposed on the reflection sheet and at a side of the light assembly;

a guide panel coupled to another side of the frame; and a display panel disposed on the light guide plate, wherein the display panel is disposed on the guide panel and overlaps with the housing wherein the housing comprises:

a first portion that extends in a front surface direction of the display device and constitutes a side surface of the display device;

a second portion that is bent from a front end of the first portion toward a central portion of the frame; and a third portion that is bent from a rear end of the first portion toward a central portion of the frame, wherein the guide panel comprises a flange that protrudes toward the central portion of the frame, wherein the flange and the second portion of the housing comprise a mounting portion depression, and wherein the mounting portion depression is disposed at a location where the flange contacts the second portion of the housing.

19. A display device, comprising:

a frame;

a reflection sheet disposed on the frame;

a housing coupled to at least one side of the frame;

a substrate disposed on the housing;

a light assembly mounted on the substrate;

a light guide plate disposed on the reflection sheet and at a side of the light assembly;

a guide panel coupled to another side of the frame; and a display panel disposed on the light guide plate, wherein the display panel is disposed on the guide panel and overlaps with the housing, and wherein at least a portion of a side surface of the housing is depressed toward an inside of the display device.

* * * * *